United States Patent [19]

Yamanaka

[11] 4,338,625

[45] Jul. 6, 1982

[54] SOLID STATE TELEVISION CAMERA

[75] Inventor: Seisuke Yamanaka, Mitaka, Japan

[73] Assignee: Sony Corporation, Tokyo, Japan

[21] Appl. No.: 210,551

[22] Filed: Nov. 26, 1980

[30] Foreign Application Priority Data

Dec. 24, 1979 [JP] Japan .................. 54-167800

[51] Int. Cl.³ .......................................... H04N 9/535
[52] U.S. Cl. ...................................................... 358/29
[58] Field of Search .............................. 358/29, 40, 44

[56] References Cited

U.S. PATENT DOCUMENTS 4,200,884 4/1980 Nagumo ............................... 358/11

4,274,107 6/1981 Tamura ............................... 358/29

Primary Examiner—Robert L. Richardson
Attorney, Agent, or Firm—Hill, Van Santen, Steadman, Chiara & Simpson

[57] ABSTRACT

A solid state color television camera provided with a control signal generator for producing control signals having signal levels set to any levels by a level setter as dots sequential control signals synchronized with dots sequential camera output signals and a gain control type amplifier gain-controlled according to the level of dots sequential control signal, the level of the dots sequential camera output signal being adjusted by a gain control type amplifier.

11 Claims, 11 Drawing Figures

SOLID STATE TELEVISION CAMERA

BACKGROUND OF THE INVENTION

1. Field of the Invention

This invention relates to a solid state color television camera employing camera elements such as CCD (Charge Coupled Device) which produces dots-sequentially bi- or tri-color signals according to color coding.

2. Description of the Prior Art

To obtain the color image signal of a predetermined standard television system from the camera output signal of a color television camera, it is necessary to carry out the signal processing such as the levelling of at least three primary color signal (so-called white balance adjustment) and the formation of luminance and chromaticity signals by process treatment and matrix.

Since, in prior signal processing circuits, the dots sequential camera color signals are converted into simultaneous signals to carry out white balance adjustment and process treatment through three channels under the condition of simultaneous signal, at least three variable voltage gain control type amplifiers and process treating circuits are needed. Accordingly, the above-mentioned prior signal processing circuits provide not only complicated circuit construction with a large number of constituent parts and a large consumption of power, but also make the whole circuit large.

SUMMARY OF THE INVENTION

Accordingly, an object of the present invention relates to a dots sequential gain control amplifier for a dot sequential color output camera which is constituted from a simple circuit adapted for IC.

Another object of the present invention is to control readily the white balance by the use of this gain control amplifier.

According to the present invention, only one variable voltage gain control type amplifier is necessary for carrying out at least white balance which allows miniaturization of the solid state color television camera and reduces the power consumption by providing a control signal generator which produces control signals having signal levels that can be set to any levels by a level setter as color dots sequential control signals synchronized with the dots sequential camera color output signals. A gain control type amplifier gain-controlled by the signal level of dots sequential control signal can be used to carry out the level adjustment of the dots sequential camera output signal.

The above-mentioned and other objects and features of the invention will become apparent from the following detailed description taken in conjunction with the drawings which indicate embodiments of the invention.

DESCRIPTION OF THE PREFERRED EMBODIMENTS

Figure 1:
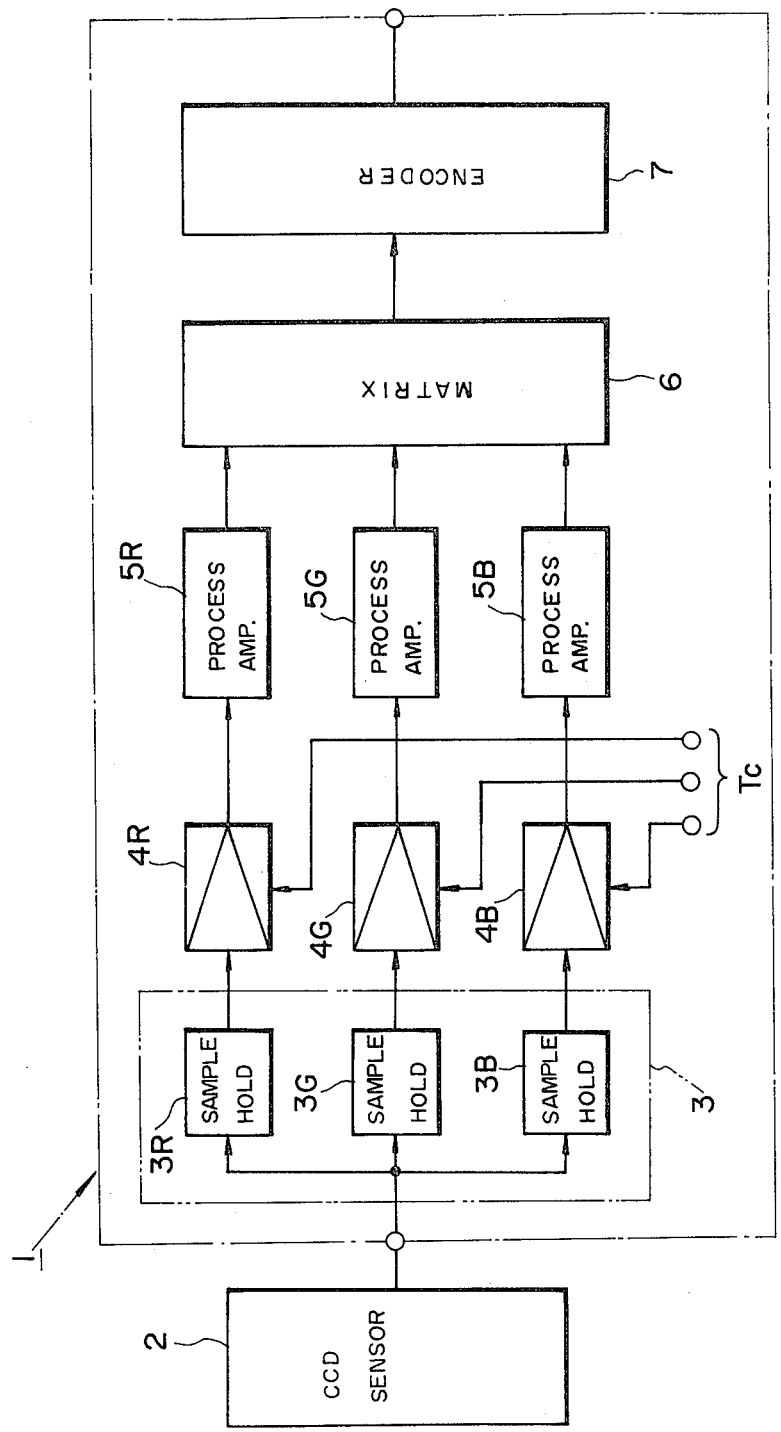
FIG. 1 is a block diagram showing a prior example of a camera output signal processing circuit.

In prior solid state color television cameras constituted from one or two solid state camera elements (for example CCD), bi- or tri-color camera output signals are dots-sequentially produced from solid state camera elements by color coding. For example, in the use of a signal processing circuit 1 constituted as shown in FIG. 1, the dots sequential camera output signals from the solid state camera elements 2 are at first separated into red, green and blue signals by a signal separator circuit 3 consisting of three sampling hold circuits 3R, 3G and 3B which converts them to simultaneous signals for signal processing such as levelling and process treatment as simultaneous signals through three channels. The red, green and blue signals are converted to said simultaneous signals and are respectively subjected to level adjustment for white balance by variable voltage gain control type amplifiers 4R, 4G and 4B such that they have the same output level when reference white color irradiated by illuminating light at the temperature of a set color is picked up. Further, terminals Tc are input terminals for gain control signals of each gain control amplifier (4R to 4B). Such white balance adjustment is carried out at the front stage side of the respective process treatment circuits 5R, 5G and 5B for non-linear signal processing. The red, green and blue signals adjusted with respect to said white balance are respectively subjected to non-linear signal processing such as γ correction processing by the process treatment circuits 5R, 5G and 5B, then converted to luminance signals and chromaticity signals by a matrix circuit 6 and thereafter converted to color image projecting signals of desired standard television system by an encoder 7.

Since the white balance adjustment and process treatment are carried out through said three channels of the three simultaneous signals converted from color dots sequential camera signals in said prior signal processing circuit 1, at least three variable voltage gain control type amplifiers 4R, 4G and 4B and process treatment circuits 5R, 5G and 5B are respectively needed. Accordingly, said prior signal processing circuit 1 provides not only a complicated circuit constituted by a large number of constituent parts and power consumption, but also has a large configuration.

Thus, the present invention, solves problems in the prior art and provides a solid state color television camera in which at least two-color signals from camera elements are subjected to at least level adjustment with respect to dots sequential camera signals produced dots-sequentially with miniature circuits and with reduced power consumption.

Hereinafter will be detailed the present invention with reference to the drawings showing an embodiment thereof.

Figure 2:
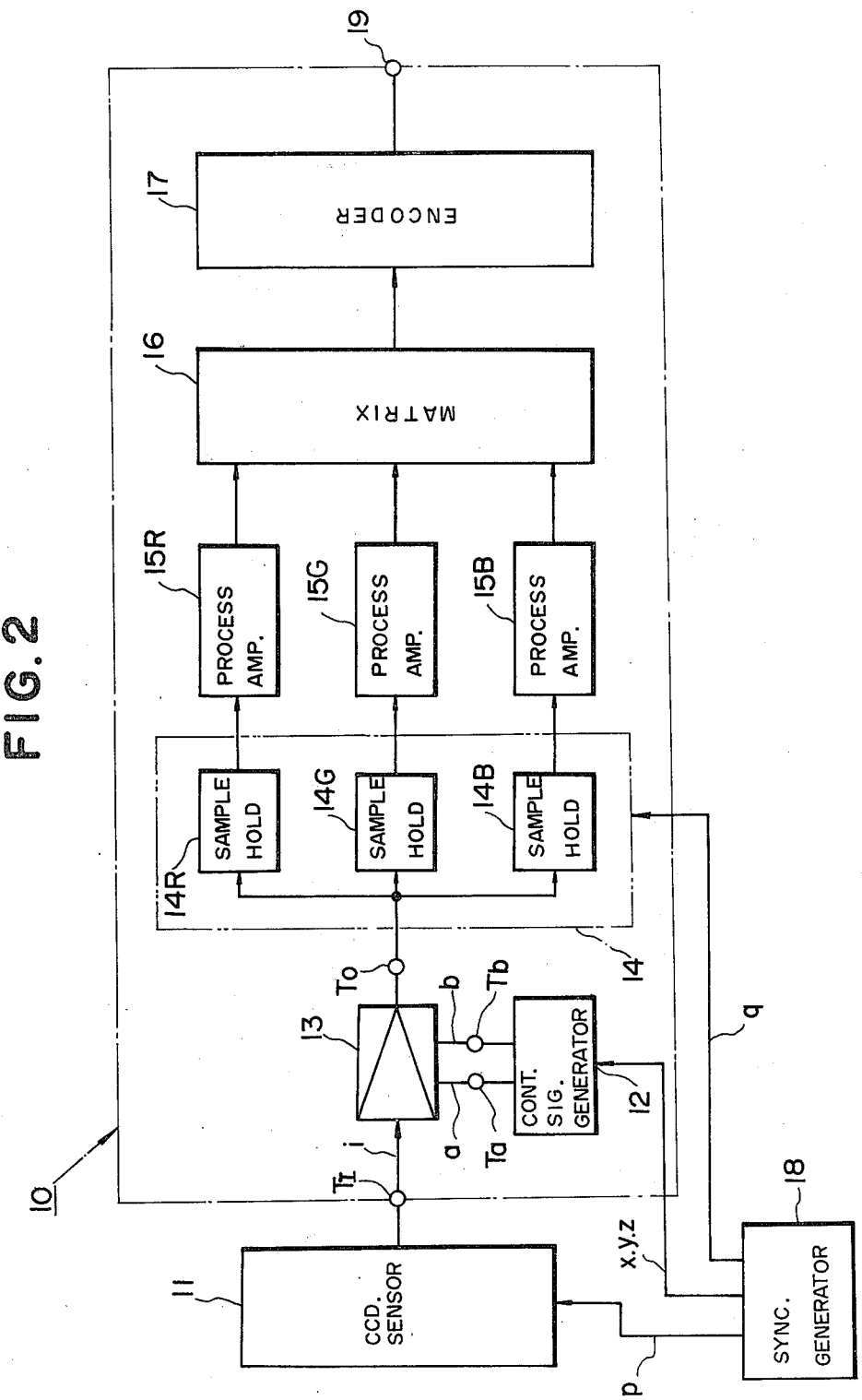
FIG. 2 is a block diagram showing a preferred embodiment of signal processing circuit according to the present invention.

In the embodiment shown in the block diagram of FIG. 2, dots sequential camera output signals produced from one part of solid state camera element 11 are supplied to a variable voltage gain control type amplifier 13 having one channel which is gain color dots-sequentially controlled by control signals a, b, received from a control signal generator 12 and the signals are levelled by the variable voltage gain control amplifier 13.

Figure 3:
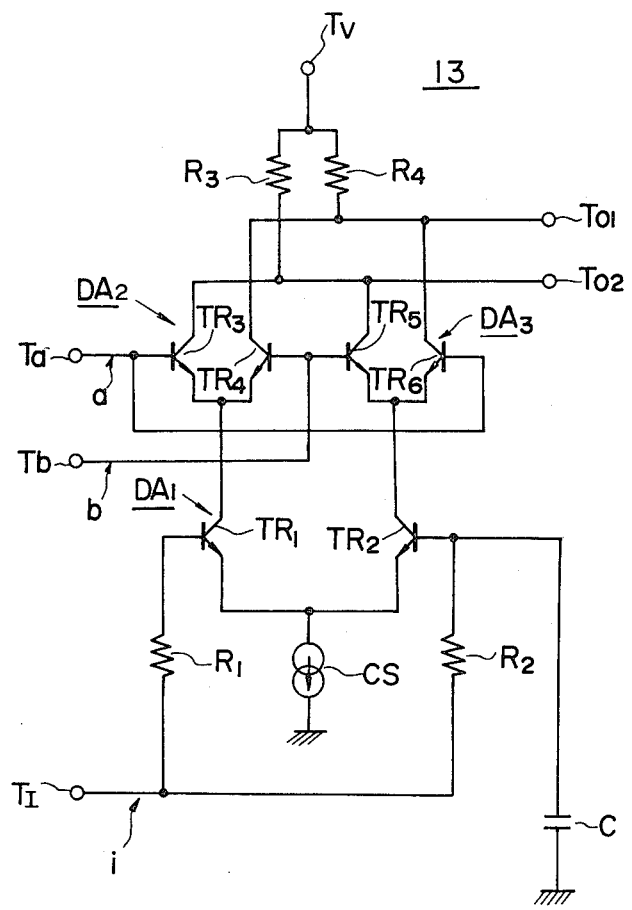
FIG. 3 is a circuit diagram showing an example of a specific circuit constituted by a variable voltage gain control type amplifier applied to said embodiment.
Figure 6:
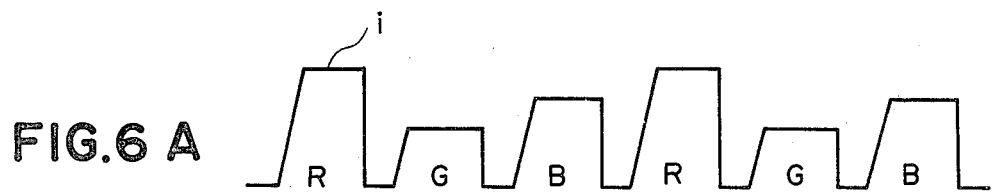
FIGS. 6 A-F are timing charts of signals corresponding to terminals in the respective portions of FIGS. 2-4.
Figure 6:
Figure 6:
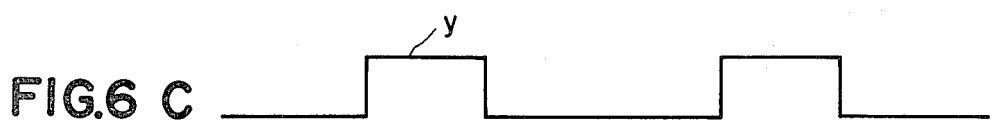
Figure 6:
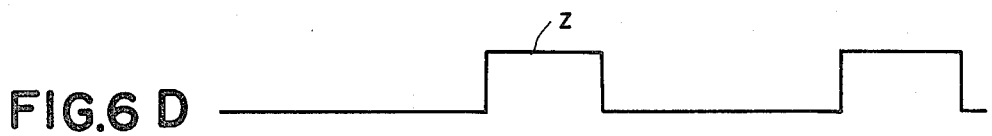
Figure 6:
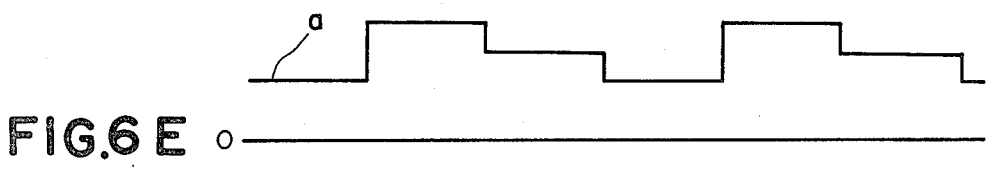
Figure 6:
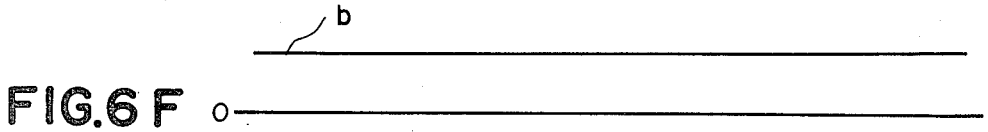

FIG. 3 shows an example of an actual circuit of the variable voltage gain control amplifier 13. In FIG. 3 a first signal input terminal $T_I$ receives the dots sequential camera color output signals i from camera element 11 which may be a CCD sensor. Terminal $T_I$ is connected through resistors $R_1$, $R_2$ to the respective bases of transistors $TR_1$, $TR_2$ constituting a first difference amplifier $DA_1$. From the output terminal $T_I$ of CCD sensor 11 (see FIG. 2) are taken the red, green and blue dots sequential color signals i. The amplitudes of the outputs do not coincide with each other, i.e., the white balance is out of order as is shown in FIG. 6-A, even if an object like a white board for example, is viewed by the camera.

The base terminal of transistor $TR_2$ is grounded through a capacitor C. Transistors $TR_1$ and $TR_2$ have their respective emitters connected to a common constant current source CS and this structure constitutes the first difference amplifier $DA_1$ which is driven by the constant current from the source CS. One transistor $TR_1$ of the first difference amplifier $DA_1$ has the collector connected in common to the emitters of transistors $TR_3$, $TR_4$ which form a second difference amplifier $DA_2$. The other transistor $TR_2$ of the first difference amplifier $DA_1$ has its collector connected to the emitters of transistors $TR_5$, $TR_6$ which form a third difference amplifier $DA_3$.

The collectors of transistors $TR_3$, $TR_5$ are connected to signal output terminal $T_{O2}$ and through resistor $R_3$ to positive power supply terminal $T_V$. The collectors of transistors $TR_4$, $TR_6$ are connected through resistor $R_4$ to positive power supply terminal $T_V$ and are directly connected to signal output terminal $T_{O1}$. The output terminals $T_{O1}$, $T_{O2}$ are connected to a sampling hold circuit of the next stage.

Second and third signal input terminals Ta, Tb receive control signals a, b, from the control signal generator 12. The second signal input terminal Ta is connected to the bases of transistors $TR_3$ and $TR_6$. The third signal input terminal Tb is connected to the bases of transistors $TR_4$ and $TR_5$.

The variable voltage gain control type amplifier 13 receives the above-mentioned constitution levels dots sequential color camera output signals which are supplied to the first signal input terminal $T_I$ and these are gain controlled in response to the signal level of the control signals supplied to the second and third signal input terminals Ta, Tb. Generally, three variable voltage gain control type amplifiers having the above-mentioned construction are used in parallel since the camera output signals which are converted to simultaneous signals are levelled. In the signal processing circuit 10 according to the present invention, however, one variable voltage gain control type amplifier 13 is used to level the camera output signals which are sequential signals.

Figure 4:
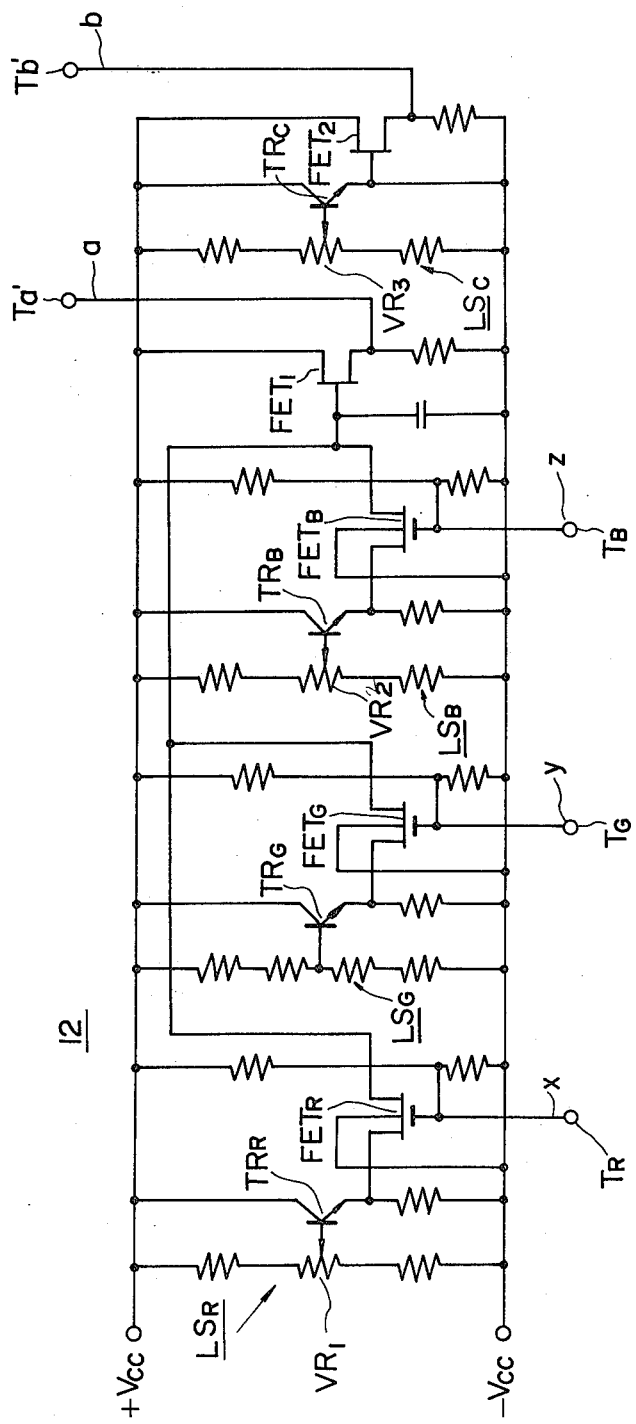
FIG. 4 is a circuit diagram showing an example of a concrete circuit constituted by a control signal generator applied to said embodiment.

The control signal generator 12 produces control signals to control said variable voltage gain control type amplifier 13 includes a circuit constituted as shown in FIG. 4, for example. In FIG. 4, there are three signal input terminals $T_R$, $T_G$ and $T_B$ to which switching signals x, y, z (see FIGS. 6-B, C, D) are applied. Signals x, y and z have the same phase, respectively, as the sampling holding pulse signals R, G, B and correspond to the output timing of the red, green and blue signals of the dots color sequential camera signals produced by said camera element 11. Signals x, y and z are respectively connected to the gates of three field-effect transistors $FET_R$, $FET_G$, $FET_B$ to control switching. The field effect transistors $FET_R$, $FET_G$, $FET_B$ are connected between three level setters $LS_R$, $LS_G$, $LS_B$. The level setters are formed as emitter-follower circuits using NPN transistors $TR_R$, $TR_G$, $TR_B$. The output of the first field effect transistor $FET_1$ is of the form of dots-sequentially color control signal a (FIG. 6-E) at a signal level set by the respective level setters $LS_R$, $LS_G$, $LS_B$ by the first signal output at terminal $Ta'$ through transistor $FET_1$ by the switching operations in response to the respective sampling holding pulse signals.

The first level setter $LS_R$ sets the signal level of the control signal for adjusting the level of the red signal and is formed so as to obtain control signals of any signal levels by varying the base bias of transistor $TR_R$ with a variable resistor $VR_1$. The second level setter $LS_G$ sets the signal level of control signals for adjusting the level of the green signal and is formed so as to obtain control signals of a predetermined signal level with the base bias of transistor $TR_G$ being held at a predetermined value. The third level setter $LS_B$ sets the level of control signal and for adjusting the level of the blue signal and is formed so as to obtain control signals at any signal level by varying the base bias of transistor $TR_B$ with a variable resistor $VR_2$. To the second signal output terminal $Tb'$ are supplied, through the second transistor $FET_2$ as the output, the control signal b (FIG. 6-F) from a fourth level setter $LS_C$ which adjusts the base bias of $FET_2$ by varying the variable resistor $VR_3$. The fourth level setter $LS_C$ sets the entire gain of said variable voltage gain control type amplifier 13 (FIG. 3).

The control signal generator 12 having the above-mentioned constitution produces dots-sequentially color control signals at the respective signal levels set by the three level setters $LS_R$, $LS_G$, $LS_B$ from the first signal output terminal $Ta'$ due to the switching operation of the three field-effect transistors $FET_R$, $FET_G$, $FET_B$ for adjusting the levels of each of the color signals of the dots sequential color camera output signal in said variable voltage gain control type amplifier 13 using the respective variable resistors $VR_1$, $VR_2$ and $VR_3$.

Dots-sequential color camera output signals which have been levelled by the variable voltage gain control type amplifier 12 which supplies control signals to the control signal generator 13 are separated into red, green and blue signals by the signal separating circuit 14 which is formed of sampling hold circuits 14R, 14G, 14B. The signals are converted to simultaneous signals. The red, green and blue signals of the camera output signals which has been converted to simultaneous signals are supplied to the general signal processing circuits and at the same time to the matrix circuit 16 through the process amplifier treatment circuits 15R, 15G, 15B. The luminance signals and chromaticity signals are formed by the matrix circuit 16 and are converted to the color image projecting signals of the desired standard television system by the encoder 17 and are supplied to the output terminal 19 of the camera. A synchronous generator supplies to the CCD sensor 11, control signal generator 12 and color signal separator 14 signals p, x, y, z and q, respectively in synchronization.

Figure 5:
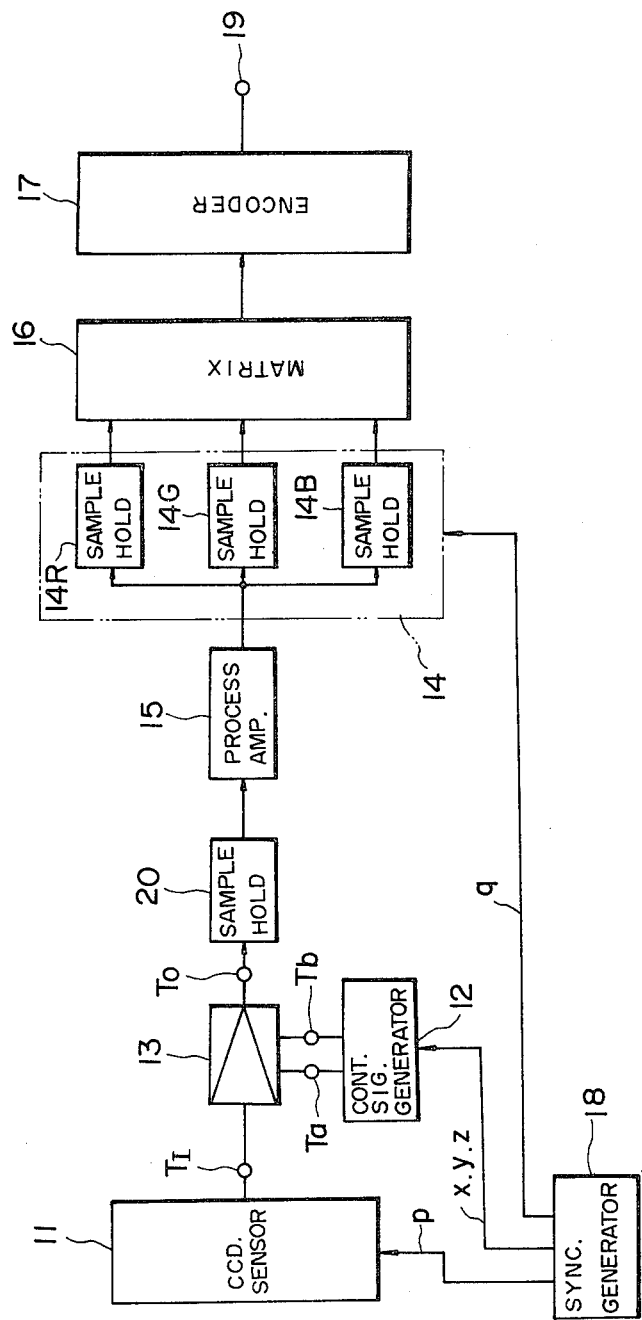
FIG. 5 is a block diagram showing another preferred embodiment of the present invention.

As shown in FIG. 5, a sampling hold circuit 20 and process treatment circuit 15 may be provided between the variable voltage gain control type amplifier 13 and signal separator circuit 14 to obtain process treatment of the dots-sequential color camera output signal at the one channel process treatment circuit 15.

Since the balance adjustment and process treatment are carried out on the dots sequential color signals in the embodiment discussed, the form of the circuit can be simplified and the power consumption will be reduced.

Also, in the above-embodiment the dots sequential color camera output signals are obtained from one region or sheet of the solid state camera element 11, but the present invention is applicable to color television cameras having two sheets of solid state camera elements if the dots sequential camera output signals are produced.

Also, the output of CCD sensor is not limited to the respective colors R, G, B, but is applicable to color signals such as cyan (cy), magenta (mag), and yellow (ye) in complementary color relationship to said color signals. Further, the output of the CCD sensor according to the present invention is not limited to the respective colors R, G, B dots-sequentially obtained over one horizontal line, but includes color signals of R, G, B obtained line-sequentially from each horizontal line as dots sequential signals.

Further, the wipers of resistors $VR_1$ to $VR_3$ in the gain control signal generator 12 may be driven manually or automatically by detecting the output level of CCD sensor 11. Also, while the present invention employs CCD sensors for image sensing devices, it may use also other elements such as MOS type solid state devices, for example.

The sync generator 18 may be a well known type generator which produces the illustrated wave shapes p, x, y, z and g which can be set to desired levels. The signals x, y, z, g and p are time synced so as to have the proper timing as illustrated in FIG. 6.

It will be apparent to those skilled in the art that many modifications and variations may be effected without departing from the spirit and scope of the novel concepts of the present invention.

I claim as my invention:

1. A solid state color television camera having a solid state image sensing device from which dots sequential color signals are picked up, which camera comprises:
    (a) a gain control signal generator for producing a gain control signal level-set at a predetermined signal level, said signal level being sequentially changed to change the output level of said solid state image sensing device;
    (b) a dots sequential gain control amplifier gain-controlled by said gain control signal receiving the output of said image sensing device,
    (c) a color signal separator receiving the output of said dot sequential gain control amplifier and having sampling-hold circuits for converting said gain controlled dots sequential color signals into simultaneous color signals; and
    (d) a synchronous signal generator for supplying drive pulses p to said image sensing device, sequential pulses x, y, z to said gain control signal generator and supplying sampling pulses q to said color signal separator and said drive pulses p sequential pulses x, y and z and sampling pulses q synchronized with each other.

2. A solid state color television camera according to claim 1 wherein said gain control signal generator has means for individually level setting said gain control signals.

3. A solid state color television camera according to claim 2, wherein said gain control signal generator further comprises switching means switched by said sequential pulses for feeding said level set control signals sequentially and one at a time.

4. A solid state color television camera according to claim 3, wherein the primary color signals picked up from said solid state image sensing device are sequentially gain controlled by said gain control amplifier.

5. A solid state color television camera having a solid state image sensing device for producing three dot sequential color signals comprising a dot sequential control amplifier having an input terminal and receiving the dot sequential color signals on said input terminal from said image sensing device, a synchronous signal generator producing timing pulses p which are supplied to said image sensing device, said synchronous signal generator producing three color gain control signals x, y and z in synchronous with the three color output signals of said image sensing device, a gain control generator receiving said three color gain control signals x, y and z from said synchronous generator and producing an output signal which has step variations in amplitude synchronously with said three sequential color signals, means for individually setting the step amplitude variations of the output signal of said synchronous generator, said dot sequential control amplifier having a gain control terminal to which said variable output signal of said gain control generator is supplied and modifying the amplitude of said three dot sequential color signals as a function of the amplitudes of said output signal, and a sample hold circuit receiving a control signal q from said synchronous generator and receiving the output of said dot sequential control amplifier and separating it into three color signals.

6. A solid state camera according to claim 5 wherein means for setting amplitudes of the output of said gain control generator comprise, three level setting voltage means to which said three gain control signals x, y and z are applied, and means for combining the outputs of said three level setting voltage means to produce said step amplitude variations of the output signal of said synchronous generator.

7. A solid state camera according to claim 6 wherein three level setting voltage means comprise a fixed voltage source, first, second and third means for varying said voltage source and first, second and third field effect transistors, respectively, connected to said first, second and third means for varying said voltage source, and the outputs of said first, second and third transistors combined to form said output signal with step variations of said gain control generator.

8. A solid state camera according to claim 7 including a fourth means for varying said voltage source in said signal generator to produce a second output signal which is supplied to said dot sequential control amplifier.

9. A solid state camera according to claim 8 wherein said dot sequential amplifier comprises, a first differential amplifier to which said dot sequential color signals from said imaging sensing device are applied, second and third differential amplifiers connected to said first differential amplifier and receiving said output signal which has step variations from said gain control generator and producing said output of said dot sequential control amplifier.

10. A solid state camera according to claim 9 wherein said second output signal of said signal generator is connected to said second and third differential amplifiers.

11. A solid state camera according to claim 5 including a process circuit connected between said sample hold circuit and said dot sequential amplifier.

* * * * *